(12) United States Patent
Chin et al.

(10) Patent No.: US 7,426,217 B2
(45) Date of Patent: Sep. 16, 2008

(54) METHOD FOR TRANSMITTING DATA BY AN AUDIO AND VIDEO PLAYBACK SYSTEM

(75) Inventors: Yi-Lon Chin, Taipei Hsien (TW); Chang-Hung Lee, Yun-Lin Hsien (TW)

(73) Assignee: Qisda Corporation, Shan- Ting Tsun, Gueishan Hsiang, Taoyuan County (TW)

( * ) Notice: Subject to any disclaimer, the term of this patent is extended or adjusted under 35 U.S.C. 154(b) by 728 days.

(21) Appl. No.: 10/904,158

(22) Filed: Oct. 27, 2004

(65) Prior Publication Data

US 2005/0094662 A1 May 5, 2005

(30) Foreign Application Priority Data

Nov. 3, 2003 (TW) .............................. 92130608 A

(51) Int. Cl.
*H04J 3/22* (2006.01)
*H04J 1/00* (2006.01)
*H04N 7/01* (2006.01)

(52) U.S. Cl. ........................ 370/465; 370/487; 386/131

(58) Field of Classification Search ......... 370/465–466, 370/487; 386/112, 131; 375/240.01–240.26

See application file for complete search history.

(56) References Cited

U.S. PATENT DOCUMENTS

| | | | | |
|---|---|---|---|---|
| 5,623,308 A | * | 4/1997 | Civanlar et al. | 375/240.01 |
| 6,377,309 B1 | * | 4/2002 | Ito et al. | 348/554 |
| 6,687,305 B1 | * | 2/2004 | Nakamura et al. | 375/240.26 |
| 7,164,714 B2 | * | 1/2007 | Martin | 375/240.01 |

* cited by examiner

*Primary Examiner*—Chi H. Pham
*Assistant Examiner*—Tri H. Phan
(74) *Attorney, Agent, or Firm*—Winston Hsu

(57) ABSTRACT

A method for transferring data by an AV playback system. The AV playback system includes a transmitting terminal and a receiving terminal connected to the transmitting terminal via a network. The receiving terminal includes a receiving buffer, a decoder buffer, and a play-out buffer. The method includes transmitting a first format data from the transmitting terminal to the receiving terminal via the network; stopping transmitting the first format data from the transmitting terminal to the receiving terminal; cleaning data in the receiving buffer, data in the decoder buffer, and data in the play-out buffer; and transmitting another format data different from the first format data from the transmitting terminal to the receiving terminal via the network.

8 Claims, 2 Drawing Sheets

METHOD FOR TRANSMITTING DATA BY AN AUDIO AND VIDEO PLAYBACK SYSTEM

BACKGROUND OF INVENTION

1. Field of the Invention

The present invention relates to a method for transmitting data by an AV playback system, and more specifically, to a method for avoiding mistakes caused from playing AV data of different formats in an AV playback system.

2. Description of the Prior Art

Nowadays the internet is developing very rapidly, and information and knowledge can be exchanged effectively. However the trend of internet multimedia is moving from static media like words and pictures to dynamic media like music and movies. But some factors such as insufficient network bandwidth and unstable transmission quality hinder the evolution of the internet. Therefore there are some problems in playing video movies on the network like non-fluid displaying frames, rough resolution, and long download times due to the limitation of the hardware and online users. To solve these problems, many companies including Microsoft® are searching for more effective methods of data transmission on the network. Among these new technologies, Streaming Media technology provides a service in which users can watch real-time programs on-line without downloading entire program data. The principle of the Streaming Media technology involves creating a buffer on the user's computer and downloading a section of data first in the buffer first. When the data transmission speed is lower than the playing speed, the playback software can access the data stored in the buffer, and play the data so as to prevent an interruption in playing.

However the data transmission terminal often switches between several different kinds of streaming media formats, like different resolutions or compression techniques, in the playing process due to the bandwidth constraints or other factors of the receiving terminal. For example, the D1 size (720*480) and 4M bps transmission speed of the MPEG streaming data is transmitted first, and then the half D1 size and 3M bps transmission speed of the MPEG streaming data is transmitted. However playing mistakes often occur because the receiving terminal receives the different formats of data and decodes the different formats of data incorrectly.

SUMMARY OF INVENTION

It is therefore a primary objective of the present invention to provide a method for transferring data by an AV playback system to solve the problems mentioned above.

Briefly summarized, a method for transferring data by an AV playback system is proposed. The AV playback system includes a transmitting terminal and a receiving terminal connected to the transmitting terminal via a network. The receiving terminal includes a receiving buffer, a decoder buffer, and a play-out buffer. The method includes: (a) transmitting a first format data from the transmitting terminal to the receiving terminal via the network; (b) after step (a), stopping transmitting the first format data from the transmitting terminal to the receiving terminal; (c) after step (b), cleaning data in the receiving buffer, data in the decoder buffer, and data in the play-out buffer; and (d) after step (c), transmitting another format data different from the first format data from the transmitting terminal to the receiving terminal via the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
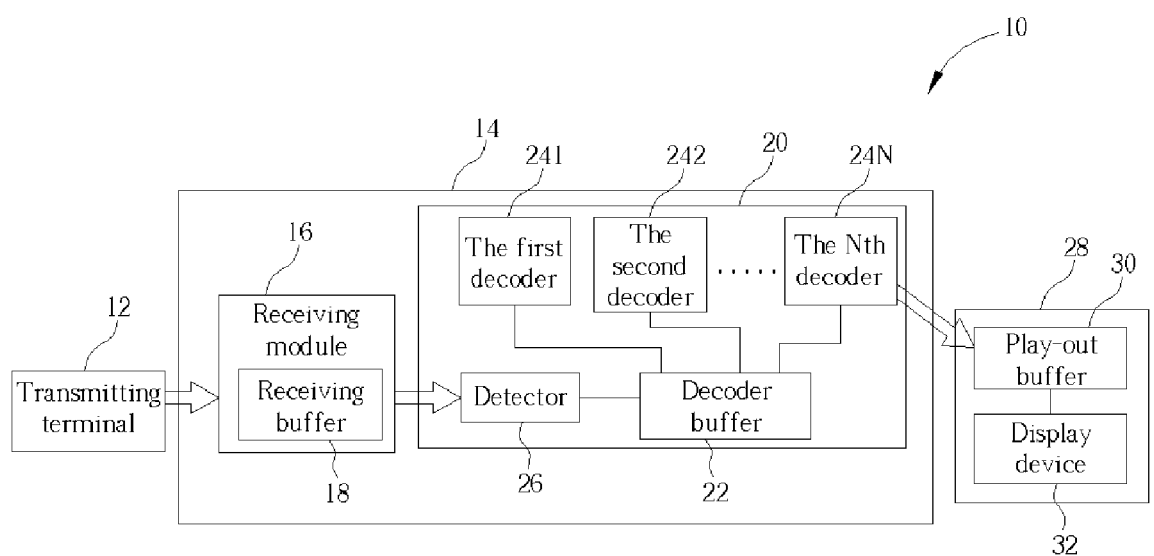
FIG. 1 is a functional block diagram of an AV playback system according to the present invention.

Please refer to FIG. 1. FIG. 1 is a functional block diagram of an AV playback system 10 according to the present invention. The AV playback system 10 includes a transmitting terminal 12 and a receiving terminal 14 connected to the transmitting terminal 12 via a network. The data transmission of the network can be wireless or wired. The receiving terminal 14 includes a receiving module 16 including a receiving buffer 18, a decoding module 20 including a decoder buffer 22, and a plurality of different decoders, the first decoder 241, the second decoder 242 to the Nth decoder 24N. The decoding module 20 further includes a detector 26. The receiving terminal 14 further includes a display module 28 including a play-out buffer 30 and a display device 32 for displaying the decoding data. The display device can be a monitor or an LCD or an audio player.

Figure 2:
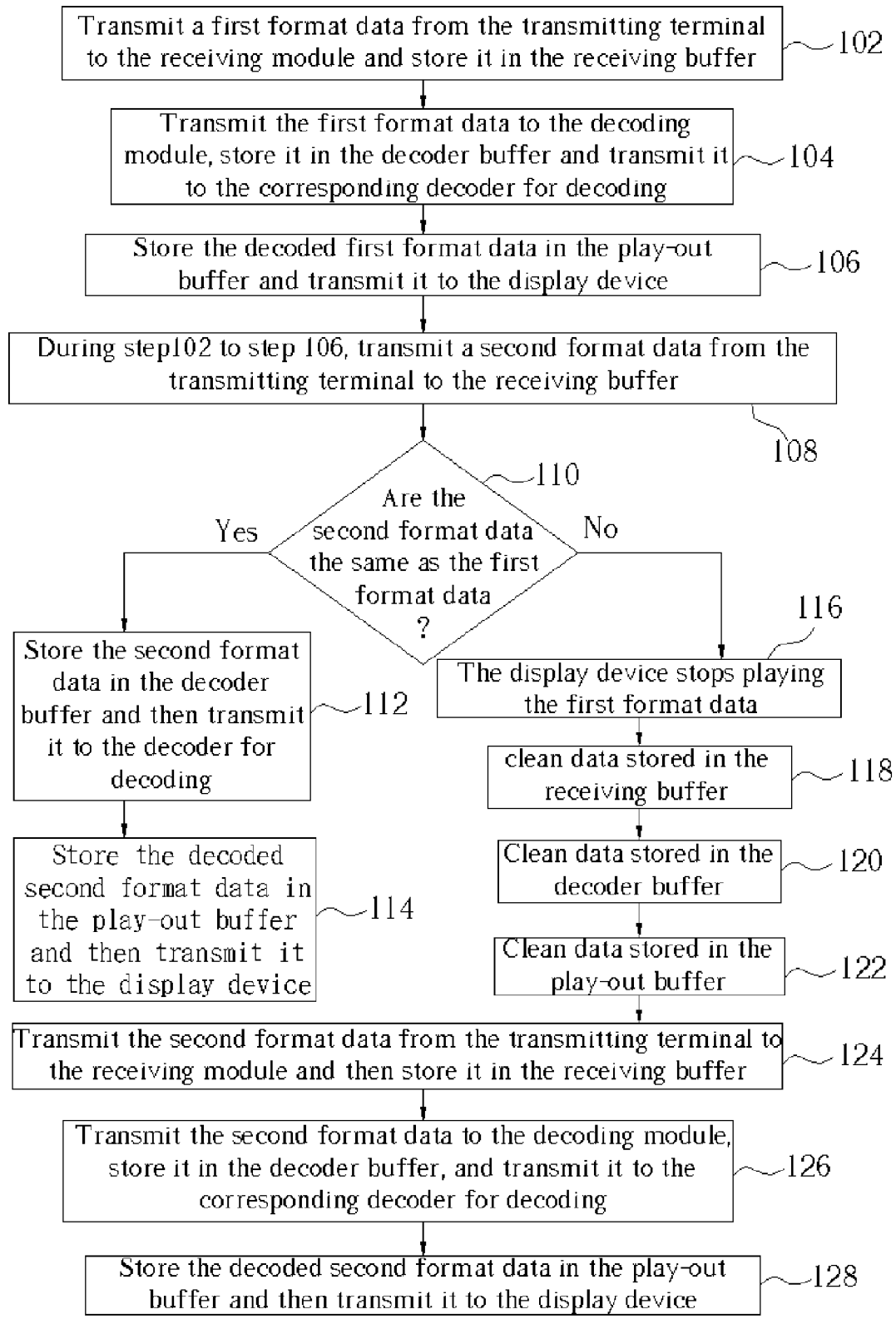
FIG. 2 contains a flowchart of the data transmission of the AV playback system according to the present invention.

Please refer to FIG. 2. FIG. 2 contains a flowchart of the data transmission of the AV playback system 10 according to the present invention. The method includes:

Step 102: transmit a first format data from the transmitting terminal 12 of the AV playback system 10 to the receiving module 16 of the receiving terminal 14, and store the first format data in the receiving buffer 18 of the receiving module 16 temporarily;

Step 104: transmit the first format data stored in the receiving buffer 18 to the decoding module 20, store the first format data received by the decoding module 20 in the decoder buffer 22 temporarily, and then transmit the first format data stored in the decoder buffer 22 to the corresponding decoder among the first decoder 241 to the Nth decoder 24N for decoding;

Step 106: transmit the decoded first format data to the play-out buffer 30 of the display module 28, and then transmit the decoded first format data stored in the play-out buffer 30 to the display device 32;

Step 108: during Step 102 to Step 106, transmit a second format data from the transmitting terminal 12 of the AV playback system 10 to receiving module 16 of the receiving terminal 14 of the AV playback system 10 simultaneously, and store the second format data in the receiving buffer 18 of the receiving module 16 temporarily;

Step 110: after Step 108, transmit the second format data stored in the receiving buffer 18 to the decoding module 20. If the detector 26 of the decoding module 20 detects that the data format of the second format data is the same as the data format of the last of the first format data, go to Step 112, and if not, go to Step 116;

Step 112: store the second format data received by the decoding module 20 in Step 110 in the decoder buffer 22, and then transmit the second format data stored in the decoder buffer 22 to the corresponding decoder among the first decoder 241 to the Nth decoder 24N for decoding;

Step 114: after Step 112, transmit the decoded second format data to the play-out buffer 30 of the display module 28, and then transmit the decoded second format data stored in the play-out buffer 30 to the display device 32, thus ending the process;

Step 116: the display device 32 stops playing the first format data;

Step 118: after Step 116, clean data stored in the receiving buffer 18 of the receiving module 16;

Step 120: clean data stored in the decoder buffer 22 of the decoding module 20;

Step 122: clean data stored in the play-out buffer 30 of the display module 28;

Step 124: after Step 122, continue transmitting the second format data from the transmitting terminal 12 to the receiving module 16 of the receiving terminal 14, and store the second format data in the receiving buffer 18 of the receiving module 16;

Step 126: transmit the second format data stored in the receiving buffer 18 to the decoding module 20, store the second format data in the decoder buffer 22, and then transmit the second format data stored in the decoder buffer 22 to the corresponding decoder among the first decoder 241 to the Nth decoder 24N for decoding; and Step 128: transmit the decoded second format data to the play-out buffer 30 of the display module 28, and then transmit the decoded second format data stored in the play-out buffer 30 to the display device 32.

The detailed description of the actions listed above is as follows. First the transmitting terminal 12 of the AV playback system 10 can transmit the first format data to the receiving module 16 of the receiving terminal 14 via a network. The network can be WLAN or can use other protocols. The first format data can be compressed with MPEG compression, like MPEG-2 or MPEG-4 compression technique. The first format data received by the receiving module 16 can be stored in the receiving buffer 18 of the receiving module 16 temporarily. And then the first format data stored in the receiving buffer 18 will be transmitted to the decoding module 20 and be stored in the decoder buffer 22 temporarily. Afterwards the first format data stored in the decoder buffer 22 will be transmitted to the decoder corresponding with the first format data among the first decoder 241 to the Nth decoder 24N for decoding. For example if the first format data are compressed in the MPEG-2 compression technique, the first format data will be transmitted to the MPEG-2 decoder for decoding. The plurality of the decoders can include an MPEG-2 decoder, an MPEG-4 decoder, and so on. Next the decoded first format data will be transmitted to the play-out buffer 30 of the display module 28, and then the decoded first format data stored in the play-out buffer 30 will be transmitted to the display device 32 for display. So users can enjoy the audio and video data transmitted from the transmitting terminal 12.

The detector 26 of the decoding module 20 can generate an interrupt signal to stop the display device 32 from playing the audio and video data received presently when the decoding module 20 receives the data whose format is different from the format of the last receiving data. If the detector 26 detects that the data format of the second format data is the same as the data format of the last of the first format data, the above-mentioned actions will be continued. And if not, the display device 32 will be stopped from playing the first format data. And then the data stored in the receiving buffer 18, in the decoder buffer 22, and in the play-out buffer 30 will be cleaned in sequence. Afterwards the second format data will be transmitted to the decoder for decoding and to the display module 20 for playback. That is, Step 124, 126, and 128 will be executed.

The first format data and the second format data can be compressed in different MPEG compression techniques or in different resolutions. For example, during the playback process the D1 (720*480) resolution of the MPEG-2 streaming data can be transmitted first, and then the D1 resolution of the MPEG-4 streaming data will be transmitted. Or the D1 resolution of the MPEG-2 streaming data can be transmitted first, and then the Half D1 resolution of the MPEG-2 streaming data will be transmitted. Or the D1 resolution of the MPEG-2 streaming data can be transmitted first, and then the Half D1 resolution of the MPEG-4 streaming data will be transmitted. The above disclosure is all within the scope of the present invention.

In contrast to the prior art, the present invention provides a method for avoiding mistakes caused from playing AV data of different formats in an AV playback system. In the present invention the display device 32 can be stopped from playing the audio and video data received presently when the decoding module 20 receives the data whose format is different from the format of the last receiving data. And then the data stored in the receiving buffer 18, in the decoder buffer 22, and in the play-out buffer 30 will be cleaned in sequence. Therefore the previous data stored in all the buffer of the receiving terminal 14 can be cleaned before the new format data will be transmitted to the receiving terminal 14, which is done for avoiding decoding and playing mistakes caused from receiving different format data separately. And then the new format data will be transmitted to the receiving terminal 14. Consequently the problem mentioned above can be solved according to the present invention.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for transferring data by an AV playback system, the AV playback system comprising a transmitting terminal and a receiving terminal connected to the transmitting terminal via a network, the receiving terminal comprising a receiving buffer, a decoder buffer, a plurality of different decoders for decoding data of different formats transmitted from the transmitting terminal, a play-out buffer, and a display device for displaying the decoded data, the method comprising:

(a) transmitting a first format data from the transmitting terminal to the receiving terminal via the network;

(b) after step (a), stopping transmitting the first format data from the transmitting terminal to the receiving terminal;

(c) after step (b), cleaning data in the receiving buffer, data in the decoder buffer, and data in the play-out buffer;

(d) after step (c), transmitting another format data different from the first format data from the transmitting terminal to the receiving terminal via the network; and (e) generating an interrupt signal to stop the display device from playing audio and video data when the decoders receive data whose format is different from the format of the last receiving data.

2. The method of claim 1 wherein in step (c) cleaning data in the receiving buffer, data in the decoder buffer, and data in the play-out buffer is performed in sequence.

3. The method of claim 1 wherein the plurality of different decoders comprises an MPEG-2 decoder and an MPEG-4 decoder.

4. The method of claim 1 further comprising:

(f) after step (a), storing the first format data in the receiving buffer;

(g) after step (f), transmitting the first format data stored temporarily in the receiving buffer to the decoder buffer, and transmitting the first format data stored in the decoder buffer to the decoder corresponding with the first format data for decoding; and (h) after step (g), transmitting the decoded data decoded by the decoder corresponding with the first format data to the play-out buffer, and transmitting the decoded data stored in the play-out buffer to the display device.

5. The method of claim 1 further comprising:

(i) after step (d), storing the data different from the first format data in the receiving buffer;

(j) after step (i), transmitting the data different from the first format data stored temporarily in the receiving buffer to the decoder buffer, and transmitting the data different from the first format data stored in the decoder buffer to the corresponding decoder for decoding; and (k) after step (j), transmitting the decoded data decoded by the corresponding decoder to the play-out buffer, and transmitting the decoded data stored in the play-out buffer to the display device.

6. The method of claim 1 wherein the first format data and another format data are compressed in different MPEG compression techniques.

7. The method of claim 1 wherein the first format data and another format data are image data in different resolutions.

8. An AV playback system for connecting to a transmitting terminal, comprising:

a receiving module for receiving a first format data transmitted from the transmitting terminal via the network, the receiving module having a receiving buffer for storing the received data;

a decoder buffer for storing data to be decoded;

a plurality of different decoders for decoding data of different formats transmitted from the decoder buffer;

a play-out buffer storing the decoded data;

a display device for displaying the decoded data stored in the play-out buffer; and a detector for detecting data received by the receiving terminal and generating an interrupt signal to stop the display device from playing audio and video data when the decoders receive data whose format is different from the format of the last receiving data and cleaning data in the receiving buffer, data in the decoder buffer, and data in the play-out buffer.

* * * * *